US008166741B2

(12) United States Patent
Barguet et al.

(10) Patent No.: US 8,166,741 B2
(45) Date of Patent: May 1, 2012

(54) RESILIENT COMPOSITE TIRE CORD (75) Inventors: Henri Barguet, Les-Martres-d'Artiere (FR); Brigitte Chauvin, Chamalieres (FR); Alain Domingo, Orleat (FR); Thibaud Pottier, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 596 days.

(21) Appl. No.: 12/278,937

(22) PCT Filed: Feb. 6, 2007

(86) PCT No.: PCT/EP2007/000993
§ 371 (c)(1),
(2), (4) Date: Jul. 13, 2009

(87) PCT Pub. No.: WO2007/090603
PCT Pub. Date: Aug. 16, 2007

(65) Prior Publication Data
US 2009/0294009 A1  Dec. 3, 2009

(30) Foreign Application Priority Data
Feb. 9, 2006  (FR) ..................................... 06 01174

(51) Int. Cl.
*D02G 3/36*  (2006.01)
(52) U.S. Cl. ....................................................... 57/216
(58) Field of Classification Search ..................... 57/210, 57/212, 213, 216, 222
See application file for complete search history.

(56) References Cited

U.S. PATENT DOCUMENTS

| | | | | |
|---|---|---|---|---|
| 2,480,005 | A | * | 8/1949 | Ewell ............................... 57/220 |
| 3,686,855 | A | * | 8/1972 | Falcy et al. ...................... 57/220 |
| 3,758,704 | A | * | 9/1973 | Naud ......................... 174/102 E |
| 3,977,174 | A | | 8/1976 | Boileau |
| 4,176,705 | A | * | 12/1979 | Russell et al. ................. 152/527 |
| 4,676,058 | A | * | 6/1987 | Foley et al. ...................... 57/218 |
| 4,878,343 | A | * | 11/1989 | Weidenhaupt et al. ......... 57/222 |
| 4,887,422 | A | * | 12/1989 | Klees et al. ...................... 57/220 |
| 6,658,836 | B2 | * | 12/2003 | Nguyen et al. .................. 57/218 |
| 7,594,380 | B2 | * | 9/2009 | Barguet et al. .................. 57/220 |
| 2005/0183808 | A1 | * | 8/2005 | Barguet et al. ................ 152/527 |

FOREIGN PATENT DOCUMENTS

| | | |
|---|---|---|
| DE | 19 08 605 | 9/1970 |
| FR | 2 873 721 | 2/2006 |
| GB | 1 100 686 | 1/1968 |

* cited by examiner

*Primary Examiner* — Shaun R Hurley
(74) *Attorney, Agent, or Firm* — Cozen O'Connor

(57) ABSTRACT

Elastic metal/textile composite cord (C-1) having two layers (Ci, Ce) of 1+N construction, formed from a core or inner layer (Ci) comprising a textile core thread (10) of diameter $d_1$ and a metal outer layer (Ce) of N wires (12) of diameter $d_2$ wound together in a helix with a pitch $p_2$ around the layer Ci, said cord being characterized in that it has the following characteristics ($p_2$ in mm): $As>1.0\%$; $At>4.0\%$; $Af>6.0\%$; $d_1>1.1d_2$; $4<p_2<14$; and the core thread (10) is a textile fibre and is embedded in a sheath (11) of diene elastomer composition, As being the structural elongation of the composite cord, At its total elongation at break, and Af being the elongation at break of the textile fibre. Use of such a cord for the reinforcement of tires, for example in the belt of these tires.

46 Claims, 3 Drawing Sheets

RESILIENT COMPOSITE TIRE CORD

RELATED APPLICATIONS

This is a U.S. National Phase Application under 35 USC 371 of International Application PCT/EP2007/000993, filed on Feb. 6, 2007

This application claims the priority of French patent application no. 06/01174 filed Feb. 2, 2006, the subject matter of which is hereby incorporated by reference.

FIELD OF THE INVENTION

The present invention relates to metal cords of the "elastic" type (i.e. those having a high elongation), which can be used in particular for reinforcing rubber articles such as tires. It relates more particularly to the use of such cords in the reinforcements for reinforcing the crown of such tires.

BACKGROUND OF THE INVENTION

A tire having a radial carcass reinforcement comprises, in a known manner, a tread, two inextensible beads, two sidewalls joining the beads to the tread and a crown reinforcement or "belt" based circumferentially between the carcass reinforcement and the tread, this belt consisting of various plies or layers of rubber which may or may not contain reinforcement elements ("reinforcing threads") such as cords or monofilaments, of the metal or textile type.

Said tire belt generally consists of at least two superposed belt plies or layers, usually termed "working" plies or "crossed" plies, the generally metallic reinforcing cords of which are in practice arranged parallel to one another within a layer, but crossed from one layer to the other (i.e. inclined, whether symmetrically or not, to the median circumferential plane), via an angle which is generally between 10° and 45° depending on the type of tire in question. These crossed layers or plies may be finished off by various other auxiliary rubber plies or layers which may or may not contain reinforcements.

In particular, as is well known, the belt may for example comprise one or more crown plies or layers, called "protective" plies, located beneath the tread and surmounting the working crown ply or plies, the role of which protective plies is to protect the rest of the belt from external attacks, tearings or other perforations. This is for example the general case in the belts of tires for heavy goods vehicles or civil engineering vehicles.

These protective plies or layers must be sufficiently flexible and deformable so as, on the one hand, to follow as closely as possible the shape of the obstacle on which the belt bears during rolling and, on the other hand, to prevent the penetration of foreign bodies radially towards the inside of said belt. To meet such criteria requires, in a known manner, the use in these protective layers of reinforcements or cords having a high elasticity and a high breaking energy.

Steel cords called "strand cords" (also termed "HE" (high elongation) cords) are normally used, these being assembled by the known technique of stranding and consisting of a plurality of metal strands twisted together in a helix, each strand comprising several (three or more) steel wires which are also wound together in a helix.

Such elastic strand cords have been described in a large number of patents or patent applications (see for example, U.S. Pat. No. 3,686,855, U.S. Pat. No. 4,176,705, WO 2004/003287 or US 2005/0183808), in particular to reinforce protective crown plies of tires for industrial vehicles such as heavy or civil engineering vehicles (see for example U.S. Pat. No. 5,843,583, U.S. Pat. No. 6,475,636, WO 2004/003287 or US 2005/0183808, WO 2004/033789 or U.S. Pat. No. 7,089,726, WO 2005/014925 or US 2006/0179813).

A well-known drawback of these strand cords is that they are expensive, this being so on two counts: firstly, they are prepared in two steps, namely by the prior manufacture of the strands followed by assembly by twisting these strands, and, on the other, they generally require their wires to have a high twist (i.e. a very short helix pitch), this twist being essential in order to give them the desired elasticity, but this involves low manufacturing rates. This drawback of course has repercussions on the cost of the tires themselves.

Another general drawback of these elastic strand cords is their large size (outside diameter). Now, a major objective of a tire manufacturer wishing to reduce the rolling resistance of said tires, and therefore the hysteresis, among others, of tire belts, is at the present time to reduce the thickness of the composite reinforcing fabrics used in these belts, in particular by developing cords that are more compact.

SUMMARY OF THE INVENTION

Applicants have discovered a novel elastic cord, of high compactness, which not only alleviates the aforementioned drawbacks of elastic strand cords but also improves the endurance of the tire belts.

As a consequence, a first aspect of the invention is directed to an elastic metal/textile composite cord having two layers (Ci, Ce) of 1+N construction, that is formed from an inner layer or core (Ci) comprising a textile core thread of diameter $d_1$ and a metal outer layer (Ce) of N wires of diameter $d_2$ wound together in a helix with a pitch $p_2$ around the inner layer Ci, said composite cord also has the following combined characteristics ($p_2$ in mm):

As>1.0%; At>4.0%; Af>6.0%; $d_1$>1.1$d_2$; 4<$p_2$<14; and
the core thread is a textile fibre and is embedded in a sheath of diene elastomer composition, As being the structural elongation of the composite cord, At its total elongation at break, and Af being the elongation at break of the textile fibre.

This two-layer cord belongs to the generic family of composite (or hybrid) metal/textile cords made up of two layers, of 1+N construction, comprising a polymer core and a metallic outer layer of N individual wires (see, as examples, GB 1 100 686, FR 2 260 660, U.S. Pat. No. 3,977,174, or US 2003/0051788).

Thanks to its specific construction, the cord of the invention has a high elasticity combined with high compactness, and excellent penetrability by the rubber, promoting its corrosion resistance. It is simple to prepare, can be manufactured in a single step, and has a low manufacturing cost. Thanks to its specific inner layer, moderate twists may be used on the N wires of its outer layer.

Another aspect of the invention relates to any composite fabric comprising a plastic and/or rubber matrix reinforced by a cord according to the invention.

Such a cord can be used as an element for reinforcing semi-finished articles or products made of plastic and/or rubber, said articles or products being in particular intended for any suspension system of motor vehicles, such as tires, internal safety supports for tires, wheels, rubber springs, elastomeric articulations, other suspension and anti-vibratory elements, and also to these semi-finished articles or products themselves.

Tires made in accordance with an aspect of the invention may be intended for vehicles of the passenger, 4 ×4 and SUV (Sport Utility Vehicles) type, but also for two-wheel vehicles, such as motorcycles, or for industrial vehicles chosen from vans, "heavy" vehicles - i.e., underground trains, buses, road transport vehicles (lorries, tractors, trailers), off-road vehicles -, agricultural or civil engineering machines, aircraft and other transport or handling vehicles.

The cord made in accordance with an embodiment of the invention is most particularly intended to be used as reinforcement element for a tire belt intended in particular for the above vehicles.

BRIEF DESCRIPTION OF THE DRAWINGS

The invention and its advantages will be readily understood in the light of the description and the following exemplary embodiments, and also FIGS. 1 to 5 relating to these embodiments, which show diagrammatically, respectively:
 a force elongation curve for an elastic cord according to the invention (FIG. 1);
 in cross section, two elastic cords of 1+N construction according to the invention, which can for example be used in a belt of a tire for a passenger vehicle, van or heavy vehicle (FIG. 2 and FIG. 3);
 in cross section, a conventional elastic strand cord of 3(1+5) construction, which can also be used in a belt of such a tire (FIG. 4); and
 in radial section, and in very general representation, a tire with a radial carcass reinforcement, for example for a passenger vehicle, van or heavy goods vehicle, which may incorporate a cord according to the invention in its belt (FIG. 5).

I. MEASUREMENTS AND TESTS

I-1. Tensile Test Measurements

As regards the metal wires and cords, the measurements of breaking force Fm (maximum load in N), tensile strength Rm (in MPa) and total elongation at break At (relative elongation in %) are carried out under tension, in accordance with the ISO 6892 (1984) standard. The force-elongation curve of the tested cords, under a standard initial prestress of 13 MPa, is recorded, from which curve the structural elongation (As) and elastic elongation (Ae) values of the cord (relative elongations in %), as shown diagrammatically for example in FIG. 1, can be deduced.

As regards the fibres, the tensile mechanical properties are measured in a known manner using an INSTRON tensile testing machine ("4D" clamps). Each textile fibre element is pulled (with a standard initial pretension of 0.5 cN/tex) with an initial length of 400 mm at a nominal rate of 200 mm/min, after prior conditioning for at least 24 hours in a standard atmosphere (according to the European standard DIN EN 20139; temperature 20±2° C.; relative humidity 65±2%). The relative elongation at break (Af) of the fibre is indicated in percent (%).

As regards the rubber composition, the modulus measurements are carried out in tension, unless otherwise indicated in accordance with the ASTM D 412 (1998) standard (test piece "C"): the "true" secant modulus (i.e. the modulus relative to the actual cross section of the test piece) at 10% relative elongation, denoted by E10 and expressed in MPa (standard temperature and relative humidity conditions in accordance with the ASTM D 1349 (1999) standard), is measured in a second elongation (i.e. after an accommodation cycle).

I-2. Air Permeability Test

The air permeability test is a simple way of indirectly measuring the degree of penetration of the cord by a rubber composition. It is performed on cords extracted directly, by decortication, from the vulcanized rubber plies which they reinforce, these cords therefore being penetrated by the cured rubber.

The test is carried out on a given length of cord (for example 2 cm) in the following manner:

Air is sent to the entry of the cord, at a given pressure (for example 1 bar), and the volume of air at the exit is measured using a flowmeter. During the measurement, the cord sample is blocked in a seal in such a way that only the amount of air passing through the cord from one end to the other, along its longitudinal axis, is taken into account by the measurement. The measured flow rate is lower the higher the degree of penetration of the cord by the rubber.

II. DETAILED DESCRIPTION OF THE DRAWINGS

II-1. Cord

The composite (metal/textile) cord of the invention having two layers (Ci, Ce) of 1+N construction, is formed from an inner layer or core (Ci) comprising a textile core thread of diameter $d_1$ and a metal outer layer (Ce) of N wires of diameter $d_2$ wound together in a helix with a pitch $p_2$ around the layer Ci; it furthermore has the following combined characteristics ($p_2$ in mm):
 As>1.0%; At>4.0%; Af>6.0%; $d_1$>1.1$d_2$; 4<$p_2$<14; and
 the core thread is a textile fibre and is embedded in a sheath of diene elastomer composition,
As being the structural elongation of the composite cord, At its total elongation at break, and Af being the elongation at break of the textile fibre.

In other words, the cord of the invention is internally rubberized ("rubberized in situ"): its core thread and its layer Ce are separated radially by a minimum thickness (or sheath) of diene elastomer composition. Without a subsequent coating by another rubber or polymer, the cord of the invention is, as such, devoid of rubber or any other polymer sheath on its periphery (i.e. around the N individual wires constituting its outer layer Ce), as shown for example in appended FIGS. 2 and 3 which will be commented upon in detail later.

The cord of the invention is a cord of the "elastic" (or "high elongation") type, i.e. a cord satisfying, by definition, in the present application, at least the two following characteristics:
 As>1.0%; At>4.0%.

It will be recalled, as is well known to a person skilled in the art (see for example the aforementioned documents U.S. Pat. No. 5,843,583 and WO 2005/014925), that the total elongation at break (At) of an elastic metal cord is the sum of three separate elongations (At=As+Ae+Ap), in which:
 a structural elongation As, resulting from the construction, the actual aeration of the cord and its intrinsic elasticity, where appropriate with a predeformation imposed on one or more of its constituent wires;
 an elastic elongation Ae, resulting from the actual elasticity of the metal of the metal wires, taken individually (Hooke's law); and
 a plastic elongation Ap, resulting from the plasticity (irreversible deformation beyond the yield point) of the metal of these metal wires taken individually.

Figure 1:
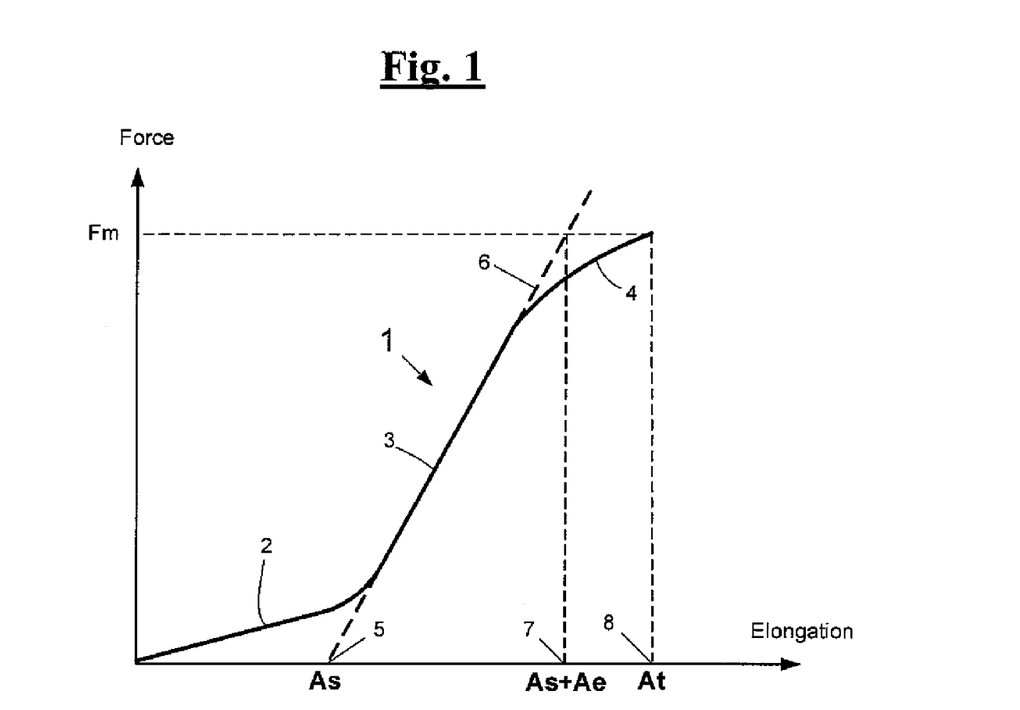

Thus, a tensile curve (or force-elongation curve) of such a cord is characterized by three modulus (slope) regions that are very different, as illustrated in FIG. 1. This tensile curve (referenced 1) clearly shows:
 a first region (2) of low slope(s) for low elongations, corresponding to the structural part of the elongation;

a second region (3) of high and substantially constant slope for the higher elongations, corresponding to the elastic part of the elongation (Hooke's law); and finally a third region (4) in which the modulus (tangent to the tensile curve) decreases with the increase in elongation, corresponding to the plastic part of the elongation.

By convention recognized by those skilled in the art, the structural elongation As is defined, on the force-elongation curve, as the point of intersection (5) between the abscissa (elongation axis) and the tangent (6) to the elastic part (3) of the tensile curve (1). The elongations As+Ae (7) and the total elongation At (8) are easily deduced from the curve as indicated in FIG. 1.

Preferably, in the cord of the invention, the following relationships are satisfied:
As>1.5%; At>4.5%.

More preferably still, the following relationships are satisfied:
As>2.0%; At>5.5%.

In the cord of the invention, the ratio $d_1/d_2$ must be greater than 1.1, preferably greater than 1.3. If the textile core is too small relative to the diameter of the metal wires, the desaturation of the outer layer Ce is insufficient and its structural aeration, as well as its elongation values As and At, are too low. There is also a risk of instability and irregularity of the assembly, all of which means that the intended minimum endurance level cannot be achieved. Moreover, depending on the applications in question, too thick a textile core may impair the compactness and increase the cost of the cord per unit cross section, and, in the end, its size in the composite or fabric which it is intended to reinforce. For all of the above-mentioned reasons, the ratio $d_1/d_2$ is preferably between 1.3 et 3.0, more preferably still within the 1.5 to 2.5 range.

The inner layer Ci of the cord, usually called the "core" by those skilled in the art, therefore comprises a textile fibre embedded in a sheathing rubber.

The term "textile fibre" is understood here to mean in general any type of textile thread, whether synthetic or natural, whether this be in the monofilament state, i.e. an elementary (unitary) filament of relatively large diameter (for example equal to or greater than 50 μm), or in the yarn (multifilament fibre) state comprising a plurality of elementary filaments of relatively small diameter (for example less than 50 μm), said monofilaments or yarns possibly being twisted (i.e. provided with a twist) or not twisted (i.e. twist-free), said yarn possibly itself being a single yarn or resulting from the assembly of several elementary strands, which are themselves twisted or not. The above definition applies both to an untreated thread and to a treated thread, comprising for example an adhesive system for rubber.

The textile fibre chosen must have, in the initial state (before manufacture of the cord) and also in the final state (after manufacture of the cord, and therefore in its sheath form), an elongation at break Af of greater than 6%, without which the structural elongation Af of the cord is insufficient and its endurance properties damaged. For this reason, it is preferable for Af to be greater than 8%, more preferably greater than 10%. Such characteristics exclude for example textile fibres having a very high modulus and a low elongation at break, such as aramid fibres.

For the reasons indicated above, the textile fibre of the core is preferably chosen from the group consisting of thermoplastic polyester (such as for example PET or PEN) fibres, thermoplastic polyamide (such as for example polyamide or Nylon-6,6) fibres, cellulose (such as rayon) fibres and blends of such fibres.

It is most particularly preferable to use a thermoplastic polyester, especially PET (polyethylene terephthalate) or PEN (polyethylene naphthalate), fibre.

Preferably, the linear density of the textile fibre is between 100 and 300 tex (weight in grams of 1000 metres of fibre: it will be recalled that 0.111 tex is equal to 1 denier), more preferably between 150 and 250 tex. This linear density is determined on a 50 m specimen, by weighing this length of fibre, after prior conditioning for at least 24 hours in a standard atmosphere (DIN EN 20139 standard).

Preferably, this textile fibre is a yarn. Its individual filaments preferably have a diameter of between 5 and 50 μm, preferably between 10 and 30 μm.

This yarn is even more preferably provided with a twist:
either it consists of a single ply called a "single yarn". In this case, its individual filaments are twisted together by a process called "folding" so as to form what is customarily called a "folded yarn"; or or it consists of several plies. In this case, it is the plies that are twisted together by an to operation called twisting so as to form a textile "cord" or "plied yarn".

The twist may advantageously modulate the structural elongation As of the cord and its stiffness (initial part of its force-elongation curve), depending on the intended application. Thus, preferably the individual filaments of the yarn have a twist of between 50 and 500 turns/metre, more preferably between 150 and 450 turns/metre.

Another advantage of a yarn is that it proved to be capable, in the cord of the invention, of retaining its tension after manufacture of the cord, unlike in the case of a monofilament which has a tendency to relax. A mechanical pretension maintained on the core will retard the mechanical work of the metal outer layer which may advantageously constitute an elongation reserve, for example in the case of the rubber-coated fabric or ply that the cord is intended to reinforce in the tire of the invention.

According to a preferred embodiment, the textile fibre is incorporated in an adhesive-coated form, i.e. it already contains an adhesive layer, for example an adhesive of the RFL (resorcinol-formaldehyde latex) type or an equivalent adhesive composition, intended to promote its adhesion to the diene elastomer composition of the sheathing rubber.

The diameter $d_1$ of the core or textile fibre is preferably between 0.2 and 1.5 mm, more preferably between 0.3 and 1 mm.

The textile fibre described above is therefore embedded in a sheath of elastomer (or rubber, the two terms being synonymous) composition of the diene type also called "sheathing rubber" in the present application.

The diene elastomers may be conventionally put into two categories, those that are essentially unsaturated and those that are essentially saturated. Thus, for example, there are butyl rubbers or diene/α-olefin copolymers of the EPDM type which come within the definition of essentially saturated diene elastomers (low or very low content of original diene units, which is always substantially less than 15%).

Although the present invention is applicable to any type of diene elastomer, it is preferably employed with a diene elastomer of the highly unsaturated type. This diene elastomer is more preferably chosen from the group consisting of polybutadienes (BR), natural rubber (NR), synthetic polyisoprenes (IR), various butadiene copolymers, various isoprene copolymers and blends of these elastomers, such copolymers being in particular chosen from the group consisting of butadiene/stirene copolymers (SBR), whether the latter are prepared by emulsion polymerization (ESBR) or by solution polymerization (SSBR), isoprene/butadiene copolymers (BIR), isoprene/stirene copolymers (SIR) and isoprene/butadiene/stirene copolymers (SBIR).

One particularly preferred embodiment consists in using an "isoprene" elastomer, i.e. an isoprene homopolymer or copolymer, in other words a diene elastomer chosen from the group consisting of natural rubber (NR), synthetic polyisoprenes (IR), various isoprene copolymers and blends of these elastomers. The isoprene elastomer is preferably natural rubber or a synthetic polyisoprene of the cis-1,4 type. Among these synthetic polyisoprenes, preferably isoprenes having a content (in mol %) of cis-1,4 bonds of greater than 90%, more preferably still greater than 98%, are used. According to other preferred embodiments, the diene elastomer may consist, completely or partly, of another diene elastomer such as, for example, an SBR elastomer used in a blend or not with another elastomer, for example of the BR type.

The sheathing rubber may contain one or more diene elastomers, the latter possibly being used in association with any type of synthetic elastomer other than a diene elastomer, or even with polymers other than elastomers.

The sheathing rubber is of the crosslinkable or crosslinked type, i.e. it comprises, by definition, a crosslinking system suitable for enabling the composition to be crosslinked (cured) during its subsequent curing in the finished article (for example a tire). Preferably, the system for crosslinking the rubber sheath is what is called a vulcanization system, i.e. one based on sulphur (or a sulphur donor) and a primary vulcanization accelerator. Various known secondary accelerators or vulcanization activators may be added to this base system. The sulphur is used in a preferred amount of between 0.5 and 10 phr, more preferably between 1 and 8 phr. The primary vulcanization accelerator, for example a sulphenamide, is used in a preferred amount of between 0.5 and 10 phr, more preferably between 0.5 and 5.0 phr.

The sheathing rubber may also comprise, in addition to said crosslinking system, all or some of the additives normally used in rubber matrices intended for the manufacture of tires, such as for example reinforcing fillers such as carbon black or inorganic fillers such as silica, coupling agents, anti-ageing agents, antioxidants, plasticizers or oil extenders, whether the latter be of aromatic or non-aromatic nature (especially oils which are only very slightly aromatic or are non-aromatic, for example of the naphthenic or paraffinic type, of high or preferably low viscosity, MES or TDAE oils), plasticizing resins of high Tg greater than 30° C., processing aids, (which make it easier to process the compositions in the uncured state), tackifying resins, anti-reversion agents, methylene acceptors and donors such as for example HMT (hexamethylene tetramine) or H3M (hexamethoxymethylmelamine), reinforcing resins (such as resorcinol or bismaleimide) and known adhesion promoter systems of the metal salt type, for example in particular cobalt or nickel salts.

The amount of reinforcing filler, for example carbon black or a reinforcing inorganic filler such as silica, is preferably greater than 50 phr, for example between 60 140 phr. It is more preferably greater than 70 phr, for example between 70 and 120 phr.

Suitable carbon blacks are all carbon blacks, especially blacks of the HAF, ISAF and SAF type, conventionally used in tires (what are called tire-grade blacks). Among the latter, mention may more particularly be made of carbon blacks of ASTM grade 300, 600 or 700 (for example N326, N330, N347, N375, N683, N772). Suitable inorganic reinforcing fillers are especially mineral fillers of the silica ($SiO_2$) type, in particular precipitated or fumed silicas having a BET surface area of less than 450 m²/g, preferably from 30 to 400 m²/g.

A person skilled in the art will be able, in the light of the present description, to adjust the formulation of the sheathing rubber so as to achieve the desired levels of properties (especially elastic modulus) and to adapt the formulation to the specific intended application.

The formulation of the sheathing rubber may be chosen to be identical to or different from the formulation of the rubber matrix that the cords of the invention are intended to reinforce, it being essential for there to be no problem of compatibility between the respective materials. Preferably, the sheathing rubber has, in the crosslinked state, a secant tensile modulus E10 (at 10% elongation) of between 4 and 25 MPa, more preferably between 4 and 20 MPa. Values in particular between 5 and 12 MPa prove to be particularly suitable for reinforcing tire belts.

The rubber sheath surrounding the core thread has a minimum thickness of preferably greater than 10 μm, more preferably greater than 20 μm, and a maximum thickness of preferably less than 200 μm, more preferably less than 100 μm, this being at any point on the inner layer (Ci).

Its average thickness is preferably between 25 and 75 μm, more preferably between 40 and 60 μm, irrespective of the diameter $d_1$ of the textile core. This preferred range of values proves to be a very good compromise in terms of feasibility, compactness, cost and in particular the property As essential for the performance and endurance of the cord in a tire.

In other words, taking into account the range of variation in the diameter $d_1$ of the core thread, the inner layer Ci (consisting, as will be recalled, of the core thread and the sheathing rubber that surrounds said thread) has a diameter which is preferably between 0.2 and 1.7 mm, more preferably between 0.3 and 1.1 mm.

The metal outer layer (Ce) therefore consists of N individual wires of diameter $d_2$, which are wound together in a helix with a pitch $p_2$ around the layer Ci described above, said pitch $p_2$ being between 4 and 14 mm. It will be recalled here that, as is well known, the pitch "p" represents the length, measured parallel to the axis of the cord, at the end of which a wire having this pitch makes one complete revolution around said axis of the cord. Too short a pitch $p_2$ (less than 4 mm) is deleterious to the structural elongation of the cord of the invention. Moreover there is a feasibility problem with risks of assembly faults. Too high a pitch $p_2$ (greater than 14 mm) is prejudicial to the elasticity of the cord. For all these reasons, the pitch $p_2$ is preferably between 5 and 12 mm, even more preferably within the range from 6 to 10 mm.

Preferably, the N wires of the layer Ce are all metallic, it however being understood that the invention also applies to the cases in which a minor fraction of them are replaced with one or more wires of a different nature, other than metallic.

The N wires of the layer Ce have a diameter $d_2$ which is preferably between 0.15 and 0.45 mm, more preferably between 0.20 and 0.40 mm.

According to a preferred embodiment of the invention, the direction of twist (Z or S) of the metallic layer Ce (i.e. that of its N wires) is the same (Z or S respectively) as that of the textile core (i.e. a twist of its individual filaments) of the layer Ci when said core is a twisted yarn. It has been found that such a configuration is even more favourable to the structural elongation As of the cord.

According to another preferred embodiment, to obtain on the one hand higher structural elongation As and on the other hand a better penetrability of the cord of the invention by any polymer matrix, thus increasing its corrosion resistance, it is preferable for the outer layer Ce to be what is called an "unsaturated" or "incomplete" layer, i.e., by definition, there is sufficient space within this tubular layer Ce to add to it at least one (N+1)th wire of diameter $d_2$, several of the N wires optionally being in contact with one another. Conversely, this tubular layer Ce would be termed "saturated" or "complete" if there did not exist sufficient space within this layer to add to it at least one (N+1)th wire of diameter $d_2$.

Preferably, the degree of unsaturation of the outer layer Ce is such that it is possible to add to it only one or two additional wires, more preferably still only a single additional wire, of diameter $d_2$.

The metal wires of the layer Ce are preferably made of steel, more preferably pearlitic (or ferritic/pearlitic) carbon steel, denoted hereafter by "carbon steel", or else stainless steel (by definition, a steel containing at least 11% chromium and at least 50% iron). Of course, it is possible to use other steels or other alloys.

When a carbon steel is used, its carbon content is preferably between 0.4% and 1.2%, especially between 0.5% and 1.1%. More preferably, it is between 0.6% and 1.0% (in % by weight of steel), such a content representing a good compromise between the required mechanical properties of the composite and the feasibility of the wires.

The metal or the steel used, whether this be in particular a carbon steel or a stainless steel, may itself be coated with a metal layer improving for example the processing properties of the metallic cord and/or of its constituent elements, or the usage properties of the cord and/or the tire themselves, such as the adhesion, corrosion resistance or ageing resistance properties.

According to a preferred embodiment, the steel used is coated with a layer of brass (Zn/Cu alloy) or of zinc. It will be recalled that, in the process for manufacturing the wires, the brass or zinc coating facilitates the drawing of the wire and also the bonding of the wire to the rubber. However, the wires could be coated with a thin metallic layer other than brass or zinc, for example one having the function of improving the corrosion resistance of these wires and/or their adhesion to the rubber, for example a thin layer of Co, Ni, Al, or an alloy of two or more of the components Cu, Zn, Al, Ni, Co, Sn.

The metal wires of the cord of the invention have a tensile strength (Rm) of preferably greater than 2000 MPa, more preferably greater than 2500 MPa. A person skilled in the art will know how to manufacture steel wires having such properties, in particular by adjusting the composition of the steel and the final degree of work hardening of these wires, depending on its particular specific requirements.

According to a preferred embodiment, the outer layer Ce comprises 4 to 10 wires (N=4-10), in other words the cord of the invention is chosen from the group of cords with 1+4, 1+5, 1+6, 1+7, 1+8, 1+9 and 1+10 constructions. According to a more preferred embodiment of the invention, the cord selected has a 1+5, 1+6 or 1+7 construction.

The cord according to the invention may be manufactured using various techniques, for example:
  firstly by sheathing, via an extrusion head, a core thread with the sheathing rubber in the uncured state, followed by
  a final cabling or stranding operation, in line with the previous operation, of the N wires of the layer Ce around the layer Ci, during which operation the N wires will transiently bear on the uncured sheathing rubber.

A person skilled in the art might expect that the sheathing rubber in the uncured state, and at a relatively high temperature, and consequently having a low viscosity, would migrate between the N wires of the outer layer before they have time to be correctly positioned. Surprisingly, nothing of the sort takes place—the viscoelasticity of the diene elastomer composition seems a posteriori to be well suited to avoiding this problem.

Preferably, the above final operation of positioning the outer layer Ce is carried out by a twisting operation, for example using a twister with a rotating feed or reception, said process substantially comprising the following steps:
  the wires of said outer layer Ce are wound in a helix with a given transient twist pitch on said inner layer Ci; then
  an overtwist is applied so as to reduce this transient pitch, that is to say to increase the helix angle of said outer layer Ce and, consequently, the helix curvature of the latter; and then
  the cord obtained is stabilized by untwisting it so as to obtain a zero residual torque.

Such a twisting process gives each wire of the outer layer Ce an excessively large curvature which moves it away, upon untwisting, from the inner layer Ci and from the sheathing rubber. This curvature is defined on the one hand by the helix diameter of this outer layer and, on the other hand, by the helix pitch $p_2$ (or else the helix angle) of said outer layer Ce.

To summarize, according to one particularly preferred embodiment of the invention, at least one of the characteristics listed below applies (independently of the others), which is satisfied in the cord of the invention:
  As>1.5%;
  At>4.5%;
  Af>8.0%;
  $1.3<(d_1/d_2)$;
  $5<p_2<12$ (mm);
  $0.2<d_1<1.5$ (mm);
  $0.15<d_2<0.45$ (mm);
  the average thickness of the diene elastomer sheath is between 25 and 75 μm;
  the textile fibre of the core is chosen from the group consisting of thermoplastic polyester fibres, thermoplastic polyamide fibres, cellulose fibres and blends of such fibres;
  the textile fibre of the core is a yarn (multifilament fibre);
  the textile fibre of the core is twisted;
  the inner layer Ci has a diameter of between 0.2 and 1.7 mm; and
  the outer layer Ce comprises 4 to 10 wires.

More preferably, all of the preferred characteristics above are satisfied.

According to an even more particularly preferable embodiment of the invention, at least one of the characteristics listed below applies (independently of the others), which is satisfied in the cord of the invention:
  As>2.0%;
  At>5.5%;
  Af>10.0%;
  $1.3<(d_1/d_2)<3.0$;
  $6 \leq p_2 \leq 10$ (mm);
  $0.3<d_1<1.0$ (mm);
  $0.2<d_2<0.4$ (mm);
  the average thickness of the diene elastomer sheath is between 40 and 60 μm;
  the textile fibre of the core is made of a thermoplastic polyester;
  the textile fibre of the core is a yarn, the twist of which is between 50 and 500 turns/metre;
  the direction of twist of the fibre of the core is the same (S or Z) as that of the N wires of the outer layer;
  the inner layer Ci has a diameter of between 0.3 and 1.1 mm; and
  the outer layer Ce comprises 5, 6 or 7 wires.

Even more preferably, all of the above more preferable characteristics are satisfied.

Of course, the invention relates to the cord described above both in the cured state (its sheathing rubber ten not being vulcanized) and in the cured state (its sheathing rubber then being vulcanized).

Figure 2:
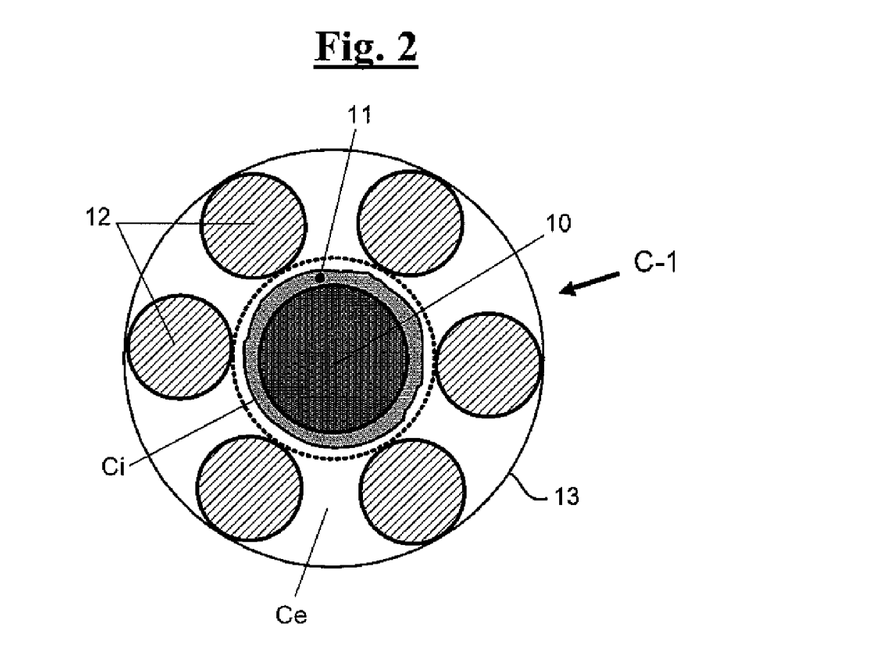
Figure 3:
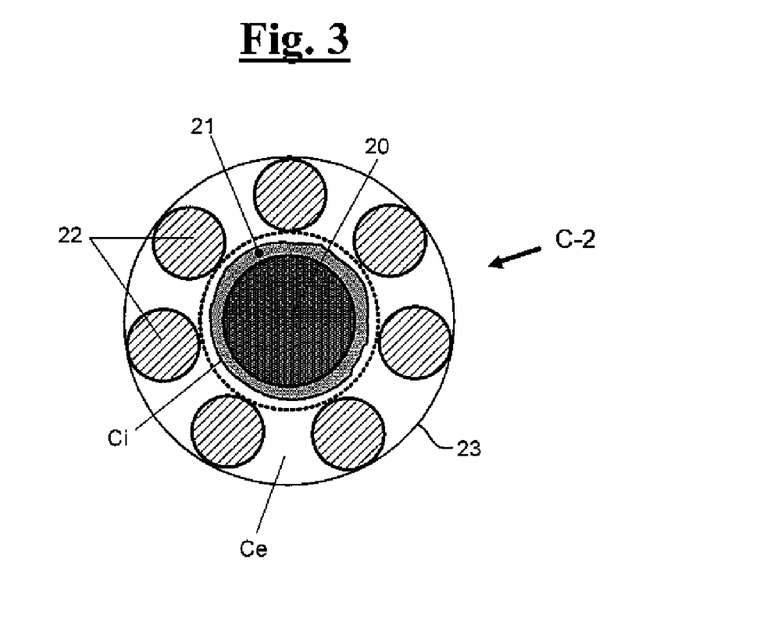

As examples, FIGS. 2 and 3 show schematically, respectively in cross section perpendicular to the axis of the cord (assumed to be straight and at rest), two preferred cords of 1+6 construction (cord denoted hereafter C-1) and 1+7 construction (cord denoted hereafter C-2).

In these schematic representations, each wire of the layer Ce has been shown, in cross section, as having a circular outline, for simplification. Of course, a person skilled in the art knows that the actual shape is that of an ellipse and not a circle, the ellipse being more pronounced the greater the twist of the outer wires (or the shorter the pitch of the twist helix).

Cords C-1 and C-2 according to the invention firstly comprise an inner layer (or core) Ci consisting of the core thread (10, 20) covered with a sheathing rubber (11, 21). The core thread consists for example of a monofilament or a yarn, for example made of a thermoplastic polyester such as PET or PEN, a thermoplastic polyamide such as nylon-6,6 or of rayon, the diameter of which is for example equal to about 0.5 mm.

In both cases, the rubber sheath (11, 21) has an average thickness of 50 μm and extends continuously around said core thread (10, 20) that it covers, i.e. this sheath is continuous in the "orthoradial" direction of the cord (perpendicular to its radius). The elastomeric composition (based on natural rubber and carbon black) constituting the sheathing rubber of the cord of the invention has for example the same formulation as that of the belt rubber ply that the cord is intended to reinforce.

The layer Ci, formed by the rubber-sheath textile core, is itself surrounded by an outer layer Ce of six or seven metal wires (12, 22), the diameter ($d_2$) of which is less than that ($d_1$) of the textile core thread (10, 20). The metal wires are wound together in a helix with a pitch $p_2$ around the layer Ci. It may be clearly seen that the wires (10, 12 on the one hand and 20, 22 on the other) are thus arranged in two tubular, concentric and essentially adjacent, layers (Ci, Ce) giving the cord its cylindrical external outline (13, 23).

The rubber sheath (11, 21) completely covers the core thread (10, 20) over its entire periphery. The curvature given when stranding each metal wire (12, 22) of the layer Ce is such that these wires are no longer, at the very least on the cord at rest (untensioned), in contact with the sheathing rubber and with the inner layer Ci.

II-2. Use in a Tire

The cord of the invention can be advantageously used as such or for example incorporated in a metal/rubber composite fabric for the reinforcement of tires.

Such a metal/rubber composite fabric may be in various forms, for example in the form of a ply, band, strip or series of strips, other blocks of rubber, and various shapes and dimensions according to the intended applications, into which cords of the invention are incorporated or with which said cords cooperate, it being moreover understood that the elastomeric compositions forming the rubber matrix of the composite may have a formulation identical to or different from that used in the cord for sheathing the textile core. In this composite, the final adhesion between the metal and the rubber composition is obtained in a known manner after the finished article (for example the tire) comprising said composite is cured. Preferably, this curing is carried out under pressure.

The cord of the invention is particularly suitable for reinforcing the belts of tires, for example tires for two-wheel vehicles such as motor cycles, or aircraft, for passenger vehicles or industrial vehicles such vans, and heavy goods or civil engineering vehicles.

Figure 5:
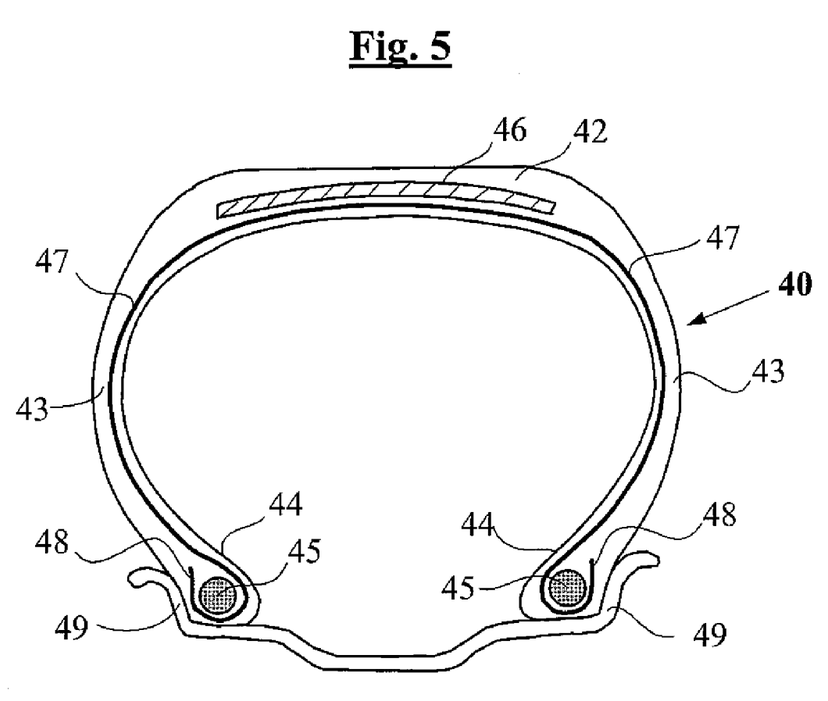

FIG. 5 shows schematically a radial section of a tire which, in this general representation, may or may not be in accordance with the invention.

This tire 40 comprises a crown 42 reinforced by a crown reinforcement or belt 46, two side walls 43 and two beads 44, each of these beads 44 being reinforced for example by a bead wire 45. The crown 42 is surmounted by a tread (not shown in this schematic figure). A carcass reinforcement 47 is wound around the two bead wires 45 within each bead 44, the upturn 48 of this reinforcement 47 being for example directed towards the outside of the tire 40, which is shown here mounted on its rim 49. The carcass reinforcement 47 consists, in a manner known per se, of at least one ply reinforced by what are called "radial" cords, i.e. these cords are arranged practically parallel to one another and extend from one bead to the other so as to make an angle of between 80° and 90° with the median circumferential plane (the plane perpendicular to the rotation axis of the tire, which is located half-way between the two beads 44 and passes through the middle of the crown reinforcement 46).

Of course, this tire 40 further includes, in a known manner, an internal rubber or elastomer layer (commonly referred to as "internal rubber") which defines the radially inner face of the tire and is intended to protect the carcass ply from the diffusion of air coming from the interior of the tire. Advantageously, in particular in the case of a tire for a heavy vehicle, it may furthermore include an intermediate elastomer reinforcement layer which is located between the carcass ply and the inner layer, intended to reinforce the inner layer and, consequently, the carcass ply, and also intended to partly delocalize the forces undergone by the carcass reinforcement.

This example of a tire according to the invention is characterized in that its belt 46 includes at least one protective ply or layer radially covering the rest of the belt, the reinforcement cords of which are cords according to the invention.

In this protective belt ply, the density of the cords according to the invention is preferably between 30 and 60 cords per dm (decimetre) of belt ply. The cords according to the invention are preferably arranged in such a way that the width (denoted by L) of the rubber bridge, between two adjacent cords, is between 0.5 and 1.5 mm. This width L represents, in a known manner, the difference between the calendering pitch (laying pitch of the cord in the rubber fabric) and the diameter of the cord. Below the minimum value indicated, the rubber bridge, which is too narrow, runs the risk of being mechanically degraded during working of the ply, especially during the deformations, in extension or shear, which it undergoes in its own plane. Beyond the maximum indicated, there is a risk of objects penetrating, by perforation, between the cords.

Preferably, the rubber composition used for the fabric of the belt ply has, in the vulcanized state (i.e. after curing), a secant tensile modulus E10 which is between 4 and 15 MPa, preferably between 5 and 12 MPa. It is within such a modulus range that the best endurance compromise between the cords of the invention on the one hand and the fabrics reinforced by these cords on the other was recorded.

III. EXEMPLARY EMBODIMENTS OF THE INVENTION

III-1. Cords of the Invention

In the following tests, layered cords according to the invention, of 1+6 and 1+7 constructions, as described above and shown schematically in FIGS. 2 and 3, are used.

The textile (PET) fibres used are well known to a person skilled in the art and commercially available, especially in adhesive-coated form, The core thread (10) of cord C-1 consists of a monofilament made of (regular) PET having a diameter of 0.5 mm (tenacity=58 cN/tex; Af=15%) coated with a known RFL adhesive. The core thread (20) of cord C-2 is a yarn made of (regular) PET with a diameter of 0.45 mm and a linear density of 144 tex (tenacity=62 cN/tex; Af=19%) provided with a twist on itself of 180 turns/metre, and also coated with adhesive.

The carbon steel wires are prepared in a known manner, starting for example from machine wires (5 to 6 mm diameter), which are initially work-hardened, by rolling and/or drawing, down to an intermediate diameter of about 1 mm. The steel used is a carbon steel of the high strength type (referred to as HT (high tensile) steel), the carbon content of which is about 0.82%, containing about 0.5% manganese, the balance consisting of iron and the usual unavoidable impurities associated with the process for manufacturing the steel.

The wires of intermediate diameter undergo a degreasing and/or pickling treatment before their subsequent transformation. After a brass coating has been deposited on these intermediate wires, what is called "final" work-hardening is carried out on each wire (i.e. after the final patenting heat treatment), by cold drawing in a wet medium with a drawing lubricant which is for example in the form of an aqueous emulsion or dispersion.

The steel wires thus drawn have the diameter $\phi$ and the mechanical properties in the following table:

TABLE 1

| Wires | $\phi$ (mm) | Fm (daN) | At (%) | Rm (MPa) |
|---|---|---|---|---|
| 12 (FIG. 2) | 0.35 | 26.3 | 2.4 | 2765 |
| 22 (FIG. 3) | 0.23 | 12.4 | 2.6 | 3100 |

The brass coating surrounding the wires has a very small thickness, appreciably less than one micron, for example around 0.15 to 0.30 μm, which is negligible compared with the diameter of the steel wires.

After the textile core has been sheathed with a diene elastomer composition in the uncured state, the metal wires are then assembled, in line with the sheathing operation, with a pitch $p_2$ so as to form the outer layer Ce. The two layered cords according to the invention thus obtained, with the references C-1 and C-2, have the construction, the external diameter $\phi_e$ (advantageously less than 1.5 mm in both cases) and the mechanical properties given in Table 2 below (the strength Rm here is calculated on just the metal section of the cord, the contribution by the layer Ci being omitted):

TABLE 2

| Cord | Construction | $\phi_e$ (mm) | Fm (daN) | Rm (MPa) | As (%) | Ae (%) | At (%) |
|---|---|---|---|---|---|---|---|
| C-1 | 1(0.50) + 6(0.35) | 1.30 | 122 | 2030 | 2.5 | 2.7 | 6.4 |
| C-2 | 1(0.45) + 7(0.23) | 0.95 | 80 | 2730 | 3.3 | 3.1 | 7.2 |

Cord C-1 (1+6), as shown schematically in FIG. 2, is therefore formed in total from 7 wires. It comprises a core Ci formed from a sheathed core thread, the diene elastomer composition being deposited via an extrusion head at a temperature of 90-100° C. This layer Ci is surrounded by a cylindrical outer layer of 6 metal wires which are themselves wound together in a helix (S direction) around the core, with a pitch $p_2$ equal to 7.0 mm (i.e. a helix angle of about 23°).

Cord C-2, as shown schematically in FIG. 3, is formed in total from 8 wires. It comprises an inner layer Ci surrounded by a cylindrical outer layer of 7 metal wires wound together in a helix (S direction) around the core, with a pitch $p_2$ equal to 5.1 mm (i.e. a helix angle of about 24°).

In both cases, the rubber sheath has an average thickness of around 50 μm. At rest, i.e. in the absence of tension on the cord of the invention (as shown schematically in particular in FIGS. 2 and 3), the N wires of the outer layer Ce are not in direct contact with the sheathing rubber, which of course increases their structural elongation. However, it may be clearly seen that the structure of this cord of the invention gives it a highly aerated character, enabling it to be penetrated from the outside, for example by rubber or any other polymeric matrix.

The diene elastomer composition (based on natural rubber and carbon black) constituting the sheathing rubber of the cord of the invention has the same formulation as that of the protective crown ply that cord C-1 is intended to reinforce in the following tests.

In particular, it should be noted that the two cords of the invention have the following preferred characteristics:

As>2.0%; At>6.0%, elastic cord C-2 at high compactness (advantageously having an external diameter of less than 1.0 mm) itself satisfying the following even more preferred characteristics:

As>2.5%; At>6.5%.

It should be noted here that two control cords of 1+6 and 1+7 structures were prepared, having strictly the same construction, respectively, as those of cords C-1 and C-2 above, except for the presence of a sheathing rubber. It turns out that, without the sheathing rubber, the structural elongation As of these control cords is substantially degraded, namely about half the elongation, compared with cords C-1 and C-2 of the invention.

III-2. Endurance in Tire

Cord C-1 of the invention was incorporated by calendering into a composition fabric formed from a known composition based on natural rubber and carbon black as reinforcing filler, said composition being conventionally used for the manufacture of protective belt plies of heavy goods vehicle tires. This composition essentially comprises, in addition to the elastomer and the reinforcing filler (carbon black), an antioxidant, stearic acid, an oil extender, cobalt naphthenate as adhesion promoter and, finally, a vulcanization system (sulphur, accelerator and ZnO). It modulus E10 is around 6 MPa.

It was compared to a conventional control strand cord, of 3(1+5) (0.23) construction, formed from 18 metal wires having a diameter of 0.23 mm. This cord, denoted hereafter by C-3, is shown schematically in FIG. 4. It consists of 3 strands (30) twisted together (S direction) with a pitch of 6 mm, each individual strand consisting of a layered cord of (1+5) construction formed from 6 identical wires (32) and the outer layer of which, consisting of 5 wires, was assembled (S direction) with a pitch of 4.0 mm. The twist helix angle, depending on the wire in question and on its position in the cord, may exceed 40°.

The properties of control cord C-3 are given in Table 3 below:

TABLE 3

| Cord | Construction | $\phi_e$ (mm) | Fm (daN) | Rm (MPa) | As (%) | Ae (%) | At (%) |
|---|---|---|---|---|---|---|---|
| C-3 | 3(1 + 5) (0.23) | 1.5 | 154 | 2140 | 1.7 | 2.3 | 6.5 |

Figure 4:
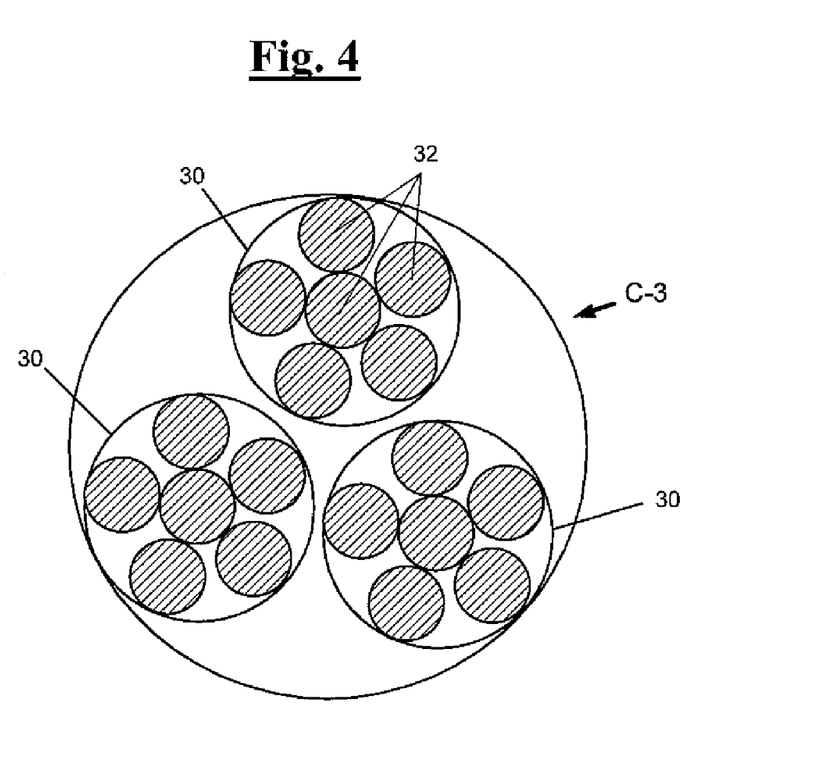

For comparison, appended FIGS. 2, 3 and 4 have been drawn approximately to the same scale so as to illustrate the considerable difference in size between the two cords of the invention, C-1 and C-2, on the one hand, and a conventional strand cord, such as C-3 in FIG. 4, on the other.

The composite fabrics reinforced by these cords C-1 and C-3 have a rubber matrix formed from two thin layers of rubber, which are superposed on either side of the cords and have a thickness of 0.7 mm (cord C-1) and 0.8 mm (cord C-3) respectively. The calendering pitch (the laying pitch of the cords in the rubber fabric) is 2.25 mm (cord C-1) and 2.50 mm (cord C-3).

Two series of running tests were then carried out on heavy vehicle tires (denoted P-1 and P-3) of 315/80 R22.5 size with, in each series, tires intended for the running test and others with decortication on a new tire. Tires P-1 reinforced with cords C-1 of the invention are the tires according to the invention. Tires P-3 reinforced by cords C-3 constitute the control tires of the prior art; owing to their recognized performance, they constitute a control of choice for this test.

Tires P-1 and P-3 are therefore identical with the exception of the cords that reinforce the single protective ply of their belt. This belt (referenced 46 in FIG. 5) consists, for example, in a manner known per se, of two triangulation half-plies reinforced with conventional metal cords inclined at 65°, which are surmounted by two superposed crossed "working plies". These working plies are also reinforced by conventional metal cords, which are inextensible and arranged approximately parallel to one another and inclined at 26° (radially inner ply) and at 18° (radially outer ply). The two working plies are covered by a single protective ply reinforced by the tested elastic metal cords (C-1 and C-3 respectively), these cords being inclined at 18°. All the angles of inclination indicated are measured relative to the median circumferential plane.

These tires were subjected to a severe running test, under overload conditions, intended to test their resistance to shocks and perforation, and also to corrosion. This test consists in making the tires roll at moderate speed on a rough ground of the "work site" type, covered with sharp stones, also imposing on them a part in which they roll in regions of the circuit inundated with salt water.

After a specified time, the test is stopped and the tested tires are then decorticated. For each tire, the number of perforations in the tread is then counted and the degree of corrosion undergone by the cords tested is qualitatively evaluated (by visual observation and then the assignment of a rating).

It is therefore found that tires P-1 reinforced by the cords of the invention, under the very harsh rolling conditions imposed thereon, show substantially improved endurance compared with control tires P-3: the number of perforations is reduced by 16% in the tread and the corrosion reduced by 20%.

The non-fatigued cords C-1 and C-3, after being extracted from the new tires, were also subjected to the air permeability test described in section I-2, by measuring the volume of air (in cm$^3$) passing through the cords in 1 minute (average of 10 measurements).

Table 4 below shows the results obtained (in relative units—with a base 100 on the control cord) in terms of average air flow rate (average of 10 measurements) and number of measurements corresponding to a zero air flow rate.

TABLE 4

| Cord | Average air flow rate (relative units) | Number of measurements at zero flow rate (in %) |
|---|---|---|
| C-1 | 0 | 100 |
| C-3 | 100 | 30 |

Cord C-1 of the invention is the one which, by far, has the lower air permeability (zero or practically zero average air flow rate) and consequently the higher degree of penetration by the rubber, taking into account its specific construction and the in situ rubberizing thereof.

In conclusion, the cord of the invention allows the endurance of tire belts to be substantially improved, in particular with respect to shocks and the risks of perforation and corrosion.

Its properties, particularly its high structural elongation combined with a smaller size, fit it for a wide range of possible applications, especially as reinforcement cord in fires.

In the belt of the tires, the cord of the invention may also be used as "circumferential" cord, oriented approximately along the circumferential direction of the tire (i.e. the direction making an angle deviating by no more than 5° from the rotation direction of the tire), for the hoop reinforcement of the tire crown, whether this cord of the invention is used in this case as such, by simple "filament" winding, or placed beforehand in various strips, layers or plies of rubber, these possibly being radially external or internal to the crossed layers or plies of said tires.

The cord of the invention can also be used to reinforce parts of the tires other than their belt, especially the carcass reinforcements, the bottom regions of tires, and in fact any part of the tire normally using, for its reinforcement, cords of the HE (high elasticity) type.

Finally, the invention also relates to any steel multi-strand rope, the structure of which incorporates at least, as individual strand, at least one cord having two layers according to the invention.

The invention claimed is:

1. An elastic composite cord (C-1, C-2) having two layers (Ci, Ce) of 1+N construction, rubberized in situ, formed from an inner layer (Ci) comprising a textile core thread (10, 20) of diameter $d_1$ and a metal outer layer (Ce) of N wires (12, 22) of diameter $d_2$ wound together in a helix with a pitch $p_2$ around the layer Ci, wherein said composite cord has the following characteristics ($p_2$ in mm):

As>1.0%; At>4.0%; Af>6.0%; $d_1$>1.1$d_2$; 4<$p_2$<14; and the core thread (10, 20) is a textile fibre and is embedded in a sheath (11, 21) of diene elastomer composition, As being the structural elongation of the composite cord, At its total elongation at break, and Af being the elongation at break of the textile fibre.

2. The cord according to claim 1, As being greater than 1.5% and At being greater than 4.5%.

3. The cord according to claim 2, As being greater than 2% and At being greater than 5.5%.

4. The cord according to claim 1, Af being greater than 8%.

5. The cord according to claim 4, Af being greater than 10%.

6. The cord according to claim 1, the ratio $d_1/d_2$ being greater than 1.3.

7. The cord according to claim 6, the ratio $d_1/d_2$ being between 1.3 and 3.0.

8. The cord according to claim 7, the ratio $d_1/d_2$ being within the range from 1.5 to 2.5.

9. The cord according to claim 1, the following relationship being satisfied:

5<$p_2$<12.

10. The cord according to claim 9, $p_2$ being within the range from 6 to 10 mm.

11. The cord according to claim 1, $d_2$ being between 0.15 and 0.45 mm.

12. The cord according to claim 11, $d_2$ being between 0.20 and 0.40 mm.

13. The cord according to claim 1, $d_1$ being between 0.2 and 1.5 mm.

14. The cord to claim 13, $d_1$ being between 0.3 and 1.0 mm.

15. The cord according to claim 1, the textile fibre being a monofilament or a yarn (multifilament fibre).

16. The cord according to claim 15, the textile fibre being a yarn.

17. The cord according to claim 16, the individual filaments forming the yarn having a diameter between 5 and 50 μm.

18. The cord according to claim 17, the individual filaments being twist-free.

19. The cord according to claim 17, the individual filaments being provided with a twist.

20. The cord according to claim 19, the twist being between 50 and 500 turns/metre.

21. The cord according to claim 20, the twist being between 150 and 450 turns/metre.

22. The cord according to claim 19, the direction of twist of the individual filaments being the same as that of the wires of the outer layer Ce.

23. The cord according to claim 1, the textile fibre being chosen from the group consisting of thermoplastic polyester fibres, thermoplastic polyimide fibres, cellulose fibres and blends of such fibres.

24. The cord according to claim 23, the textile fibre being a PET or PEN fibre.

25. The cord according to claim 1, the diene elastomer sheath having a minimum thickness of greater than 10 μm and a maximum thickness of less than 200 μm.

26. The cord according to claim 25, the diene elastomer sheath having a minimum thickness of greater than 20 μm and a maximum thickness of less than 100 μm.

27. The cord according to claim 1, the diene elastomer sheath having an average thickness of between 25 and 75 μm.

28. The cord according to claim 27, the diene elastomer sheath having an average thickness of between 40 and 60 μm.

29. The cord according to claim 1, the inner layer Ci, consisting of the core thread and the sheathing rubber that surrounds said thread, having a diameter which is between 0.2 and 1.7 mm.

30. The cord according to claim 29, the inner layer Ci having a diameter which is between 0.3 and 1.1 mm.

31. The cord according to claim 1, the diene elastomer being chosen from the group consisting of polybutadienes, natural rubber, synthetic polyisoprenes, butadiene copolymers, isoprene copolymers and blends of these elastomers.

32. The cord according to claim 31, the diene elastomer being chosen from the group consisting of natural rubber, synthetic polyisoprenes and blends of these elastomers.

33. The cord according to claim 32, the diene elastomer being natural rubber.

34. The cord according to claim 1, the diene elastomer composition containing carbon black as reinforcing filler.

35. The cord according to claim 1, the diene elastomer composition being in the uncured state.

36. The cord according to claim 1, the diene elastomer composition being in the vulcanized state.

37. The cord according to claim 36, the diene elastomer composition having a secant tensile modulus, at 10% elongation, which is between 4 and 25 MPa.

38. The cord according to claim 1, the outer layer Ce comprising 4 to 10 wires.

39. The cord according to claim 38, the outer layer Ce comprising 5 to 7 wires.

40. The cord according to claim 1, the N wires of the layer Ce being made of carbon steel and/or stainless steel.

41. A composite fabric comprising a matrix made of plastic and/or rubber reinforced by a cord according to claim 1.

42. A tire reinforced by a cord according to claim 1.

43. The tire according to claim 42, comprising a carcass reinforcement which is anchored in two beads and is surmounted radially by a belt which is itself surmounted by a tread which is joined to said beads by two sidewalls, wherein said cord reinforces said belt.

44. A process for manufacturing a cord according to claim 1, wherein the process comprises the steps of:
   a first operation of sheathing, via an extrusion head, a textile core thread with the sheathing rubber in the uncured state, in order to constitute the inner layer Ci, followed by:
   a second operation of cabling or twisting, in line with the first operation, N wires of the outer layer Ce around the layer Ci.

45. The process according to claim 44, wherein the second operation consists of a twisting operation.

46. The process according to claim 45, the twisting step essentially comprising the steps of:
   the wires of said outer layer Ce are wound in a helix with a given transient twist pitch on said inner layer Ci; then
   an overtwist is applied so as to reduce this transient pitch, that is to say to increase the helix angle of said outer layer Ce and, consequently, the helix curvature of the latter; and then
   the cord obtained is stabilized by untwisting it so as to obtain a zero residual torque.

* * * * *